US009637150B1

(12) United States Patent
Macfarlane et al.

(10) Patent No.: US 9,637,150 B1
(45) Date of Patent: May 2, 2017

(54) TRANSPORT HANDLE FOR LOW PROFILE DISPLACEMENT

(71) Applicant: Amazon Technologies, Inc., Reno, NV (US)

(72) Inventors: Timothy Christensen Macfarlane, Tacoma, WA (US); Douglas Carlin Thigpen, II, Gig Harbor, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 526 days.

(21) Appl. No.: 13/929,153

(22) Filed: Jun. 27, 2013

(51) Int. Cl.
*B62B 1/00* (2006.01)
*B62B 3/02* (2006.01)

(52) U.S. Cl.
CPC ...................... *B62B 3/02* (2013.01)

(58) Field of Classification Search
CPC .. B62B 1/12; B62B 1/14; B62B 1/002; B62B 1/00; B62B 1/042; B62B 1/125; B62B 3/02; B62B 5/067; B62B 2203/74; B62B 2203/10; B62B 2203/44; B62B 2205/006; B62B 2205/12; B62B 2205/33; B62B 2206/02; B62B 2206/06; B62B 2301/02
USPC .......................... 280/79.5, 43.11, 655, 655.1
See application file for complete search history.

(56) References Cited

U.S. PATENT DOCUMENTS

| | | | | |
|---|---|---|---|---|
| 2,469,242 A | * | 5/1949 | Pohl ............................... | 280/651 |
| 3,400,942 A | * | 9/1968 | Hull ............................... | 280/39 |
| 3,841,650 A | * | 10/1974 | Miskelly ........................... | 280/37 |
| 4,609,200 A | * | 9/1986 | Winter ............................. | 280/5.2 |
| 5,024,455 A | * | 6/1991 | Schrecongost ................... | 280/37 |
| 5,294,145 A | * | 3/1994 | Cheng ............................ | 280/654 |
| 5,525,884 A | * | 6/1996 | Sugiura et al. ................ | 318/587 |
| 5,549,318 A | * | 8/1996 | Ho ................................. | 280/654 |
| 5,672,947 A | * | 9/1997 | Hisada et al. ................. | 318/587 |
| 6,059,512 A | * | 5/2000 | Kielinski ............... | B62B 5/0089 280/47.18 |
| 6,899,346 B2 | * | 5/2005 | Pfeiffer ................ | A45C 13/385 190/110 |
| 6,923,468 B1 | * | 8/2005 | Barnett et al. ................ | 280/651 |
| 7,744,101 B2 | * | 6/2010 | Robbins et al. ............. | 280/47.2 |
| 7,871,089 B1 | * | 1/2011 | Henderson .................. | 280/47.27 |
| 8,251,379 B2 | * | 8/2012 | Watzke .......................... | 280/35 |
| 8,485,773 B2 | * | 7/2013 | Coats ........................ | B62B 1/06 280/47.3 |
| 8,695,736 B1 | * | 4/2014 | Samaroo ............... | B65F 1/1452 180/11 |

(Continued)

*Primary Examiner* — James M Dolak
(74) *Attorney, Agent, or Firm* — Thomas | Horstemeyer LLP; Michael J. D'Aurelio; Jason M. Perilla

(57) ABSTRACT

Aspects of a transport handle for low profile displacement of an item for transport are described. In one embodiment, the transport handle includes an extension arm, an extension arm cross bar secured to one end of the extension arm, and a transport base locking bar secured to another end of the extension arm. The transport base locking bar may include an attachment hook or displacement facet for mechanically coupling to and displacing the item for transport when a force is applied to the transport handle. In other aspects, the transport handle may include a transport base extension bar that substantially extends over a top surface of the item for transport, and one or more wheels secured to the extension arm cross bar for transporting the transport handle from place to place.

20 Claims, 5 Drawing Sheets

(56) References Cited

U.S. PATENT DOCUMENTS

| | | | | |
|---|---|---|---|---|
| 8,794,898 B2* | 8/2014 | Suyehira | ................... | B62B 1/14 |
| | | | | 414/452 |
| 9,278,704 B2* | 3/2016 | Cates | ................... | B62B 5/0089 |
| 9,302,688 B2* | 4/2016 | Reddi | ................... | B62B 1/002 |
| 9,308,927 B2* | 4/2016 | Weaver | ................... | B62B 1/264 |
| 9,365,224 B1* | 6/2016 | Koshutin | ................ | B62B 1/042 |
| 9,365,226 B1* | 6/2016 | Chheda | ................... | B62B 3/04 |
| 9,428,156 B2* | 8/2016 | Davison | ................... | B60P 3/07 |
| 9,428,346 B2* | 8/2016 | Gao | ........................ | B62B 3/02 |
| 9,446,777 B2* | 9/2016 | Umbro | ................... | B62B 1/12 |
| 2002/0140191 A1* | 10/2002 | Knowlton | ............... | B62B 1/264 |
| | | | | 280/47.29 |
| 2003/0090074 A1* | 5/2003 | Smith | ................... | B62B 1/26 |
| | | | | 280/47.34 |
| 2003/0194303 A1* | 10/2003 | Lunger | ................... | B62B 1/14 |
| | | | | 414/444 |
| 2004/0021280 A1* | 2/2004 | Peggs | ................... | B62B 1/125 |
| | | | | 280/47.24 |
| 2008/0107511 A1* | 5/2008 | Oberg | ................... | B62B 1/06 |
| | | | | 414/445 |

\* cited by examiner

TRANSPORT HANDLE FOR LOW PROFILE DISPLACEMENT

BACKGROUND

Robotic drive systems are useful in warehouse and fulfillment center operations for moving shelves and other heavy items. One example of such a robotic drive system is the KIVA® R drive unit. The KIVA® R drive unit is a low-lying mobile drive unit with a top mounted lifting plate that may be positioned under a shelving system by the drive unit, and raised to lift the shelving system off the ground for transport. In certain cases, such low-lying drive units must be moved manually. However, it may be challenging to move such drive units or other parcels, bundles, or loads, especially ones having relatively large weight, size, and low center of gravity. Generally, movement of such low-lying drive units requires a person to bend over and manually apply a large lateral force perpendicular to the ground. Especially if repeated or performed over a prolonged period of time, manual movement of low-lying drive units may result in discomfort or injury.

BRIEF DESCRIPTION OF THE DRAWINGS

Aspects of the present disclosure can be better understood with reference to the following drawings. It is noted that the elements in the drawings are not necessarily to scale, with emphasis instead being placed upon clearly illustrating the principles of the embodiments. In the drawings, like reference numerals designate like or corresponding, but not necessarily the same, elements throughout the several views.

DETAILED DESCRIPTION

Figure 1:
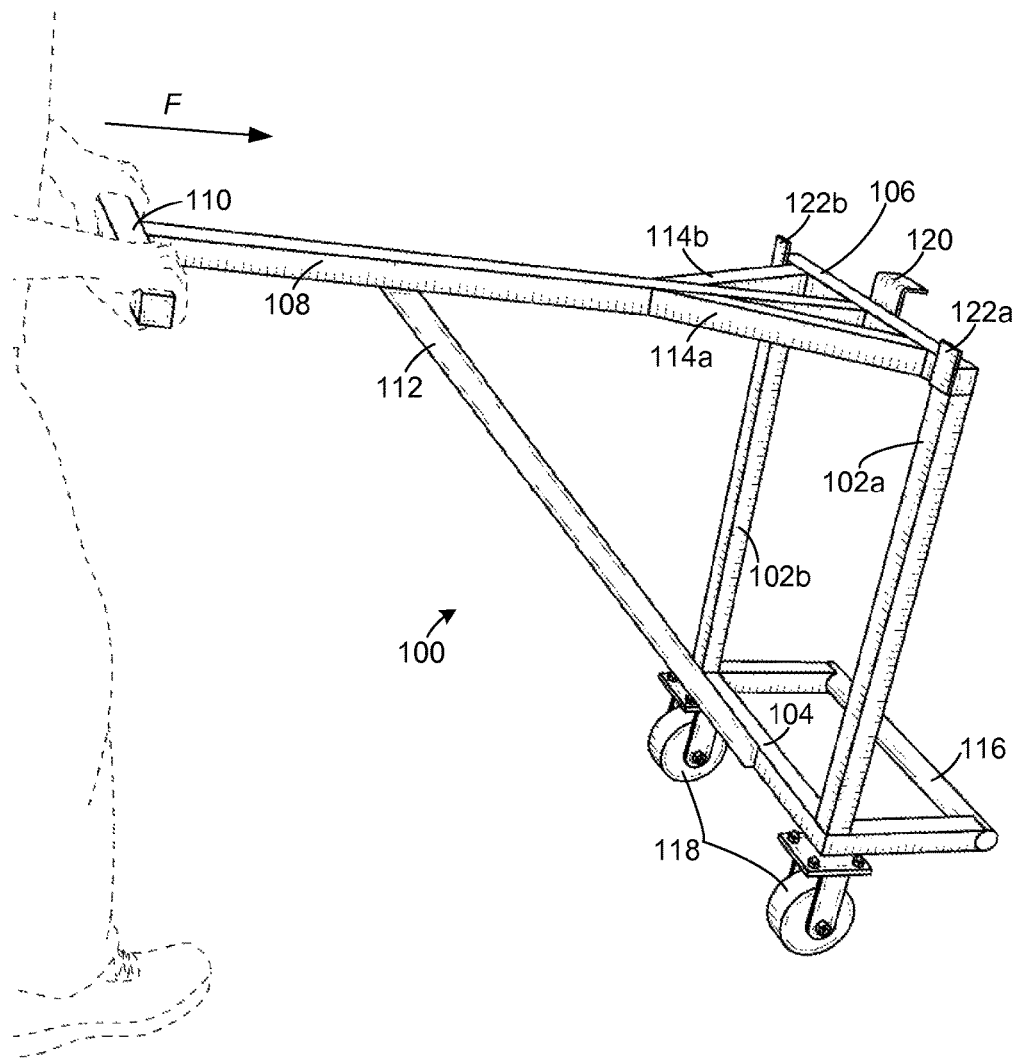
FIG. 1 illustrates a transport handle for low profile displacement of a parcel or drive unit according to one example embodiment.

The drawings illustrate only example embodiments and are therefore not to be considered limiting of the scope of the embodiments described herein, as other equally effective embodiments are within the scope and spirit of the disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles.

In the following discussion, a general description of a transport handle is provided, followed by a discussion of the use and operation of the same. Although certain embodiments are discussed herein in connection with displacement of a parcel or drive unit, the transport handle is not limited to transporting any particular item, parcel, or drive unit. In other words, as used herein, the terms item, parcel, drive unit, or robotic drive unit are not intended to be limited to any particular parcel, drive unit, or item specifically. Rather, the embodiments of the transport handle described herein may be relied upon to assist with the movement or transportation of any movable items, parcels, bundles, loads, packages, drive units, robotic drive units, etc., without limitation.

In one embodiment of the transport handle described herein, the transport handle includes an extension arm, an extension arm cross bar secured to one end of the extension arm, and a transport base locking bar secured to another end of the extension arm. The transport base locking bar may include an attachment hook or displacement facet for mechanically coupling to and displacing the low profile parcel or drive unit when a force is applied to the transport handle. In other aspects, the transport handle may include a transport base extension bar that substantially extends over a top surface of the low profile parcel or drive, and one or more wheels secured to the extension arm cross bar for transporting the transport handle from place to place.

Referring now to the drawings, embodiments of the transport handle are described in further detail.

FIG. 1 illustrates a transport handle 100 for low profile displacement of a parcel or drive unit according to one example embodiment. The transport handle 100 includes extension arm bars 102a and 102b (i.e., extension arm 102), an extension arm cross bar 104, a transport base locking bar 106, a transport base displacement extension bar 108, a transport base lateral support bar 110, a handle 116 secured to the extension arm cross bar 104, and wheels 118 secured to the extension arm cross bar 104. In various embodiments, the transport handle 100 further includes one or more cross-support bars, such as the cross-support bars 112, 114a, and 114b, for example. Further, the transport handle 100 includes one or more attachment member or hook 120 and/or one or more displacement member or facet 122 for mechanically coupling to and displacing a parcel or drive unit, as discussed in further detail below.

In FIG. 1, the transport handle 100 is illustrated in a position for transporting the transport handle 100. Particularly, the transport handle 100 is positioned with the wheels 118 resting upon the ground such that, with application of a force "F" by a user, the transport handle 100 may be pushed from place to place with relative ease. In this context, it should be appreciated that the wheels 118 facilitate transportation of the transport handle 100 from place to place, especially in embodiments where the transport handle 100 is of such dimensions that carrying the transport handle 100 may be uncomfortable or unwieldy. In various embodiments, the wheels 118 may include swiveling casters, for example, or other types of mounted wheels with pivots suitable for the application. Although two wheels 118 are illustrated in FIG. 1, the transport handle 100 may include additional or fewer wheels 118. Additionally, it is noted that the wheels 118 may be secured or mounted to the extension arm cross bar 104 at any suitable location among embodiments.

The transport handle 100 may be constructed from any material suitable for the application, such as wood, aluminum, plastic, or other materials, without limitation. The type of material may be selected based on the application for which the transport handle 100 is designed for use. For example, if the transport handle 100 is designed for transportation of relatively large and/or heavy parcels, then the transport handle 100 may be constructed from a material of relative strength, even if the material is heavy. On the other hand, if the transport handle 100 is designed for transportation of relatively small and/or light parcels, then the transport handle 100 may be constructed from a material of suitable strength but relatively lighter weight. Certain elements or parts of the transport handle 100, such as the extension arm 102, the extension arm cross bar 104, the transport base locking bar 106, and the transport base displacement extension bar 108 may be formed as extrusions or pipes, for example. The cross sections of these parts may be substantially square, rectangular, circular, or any other suitable shape, among embodiments, without limitation.

The respective elements or parts of the transport handle 100, such as the extension arm 102, the extension arm cross bar 104, the transport base locking bar 106, the transport base displacement extension bar 108, and the transport base lateral support bar 110, for example, may be secured together by welds, screws, rivets, adhesives, or other means suitable for the application or combinations thereof, without limitation. In general, the transport handle 100 may be assembled in any suitable manner from any suitable material, based on the application for use.

Principally, the transport handle 100 is designed to assist with the transportation of items that are relatively low-lying, low to the ground, or having a low profile, but may be used to assist with the transportation of other items. Especially in situations where an item is low-lying and relatively heavy, the transport handle 100 is designed to assist a user in the transportation of the item by displacing a lateral force provided at an approximate height of the user's waist or chest to a lower-lying position of the item, while generally maintaining the direction of the lateral force. As described in further detail below, the maintenance of the lateral direction of the force achieves good efficiency in work by avoiding translation of the force to a direction parallel to the force of the weight of the item being transported.

Figure 2:
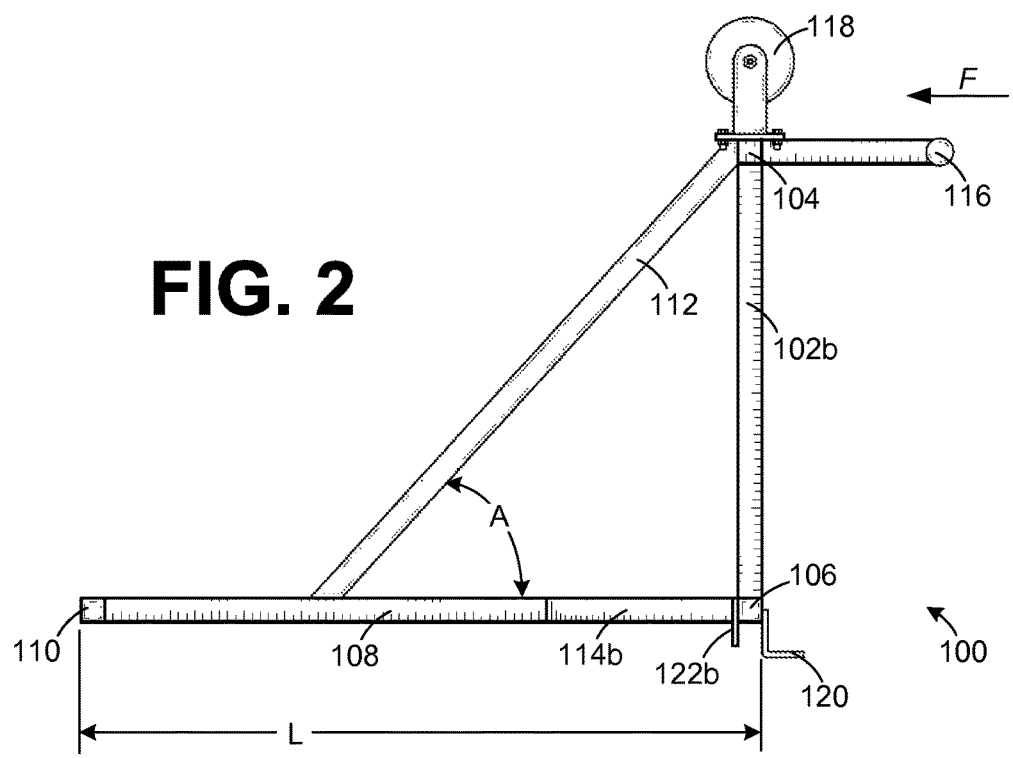
FIG. 2 illustrates a side view of the transport handle for low profile displacement according to one example embodiment.
Figure 3:
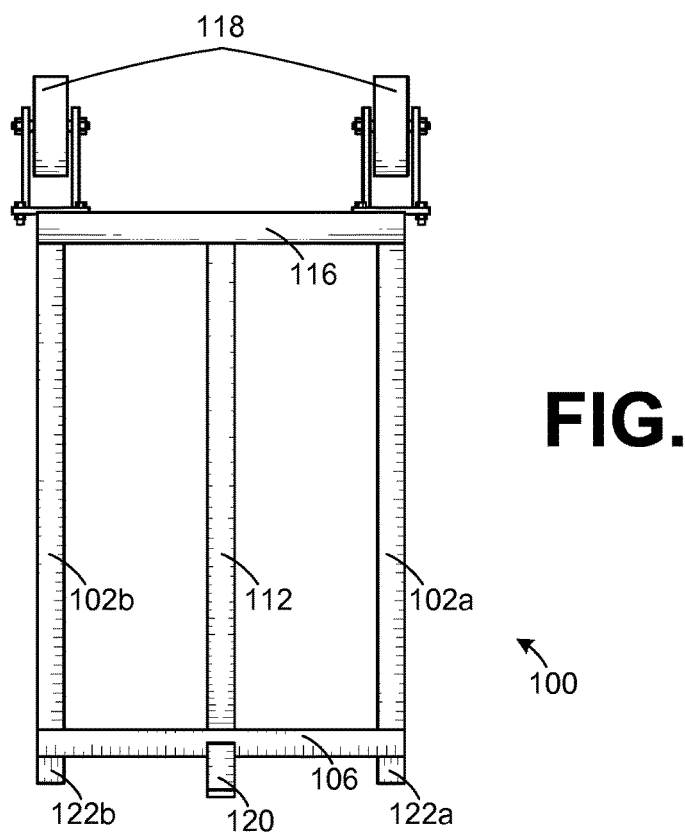
FIG. 3 illustrates a front view of the transport handle for low profile displacement according to one example embodiment.

FIG. 2 illustrates a side view of the transport handle 100 for low profile displacement of the parcel or drive unit according to one example embodiment, and FIG. 3 illustrates a front view of the transport handle for low profile displacement of the parcel or drive unit according to one example embodiment. Aspects of the design of the transport handle 100 are described in connection with both FIGS. 2 and 3 below.

Figure 4:
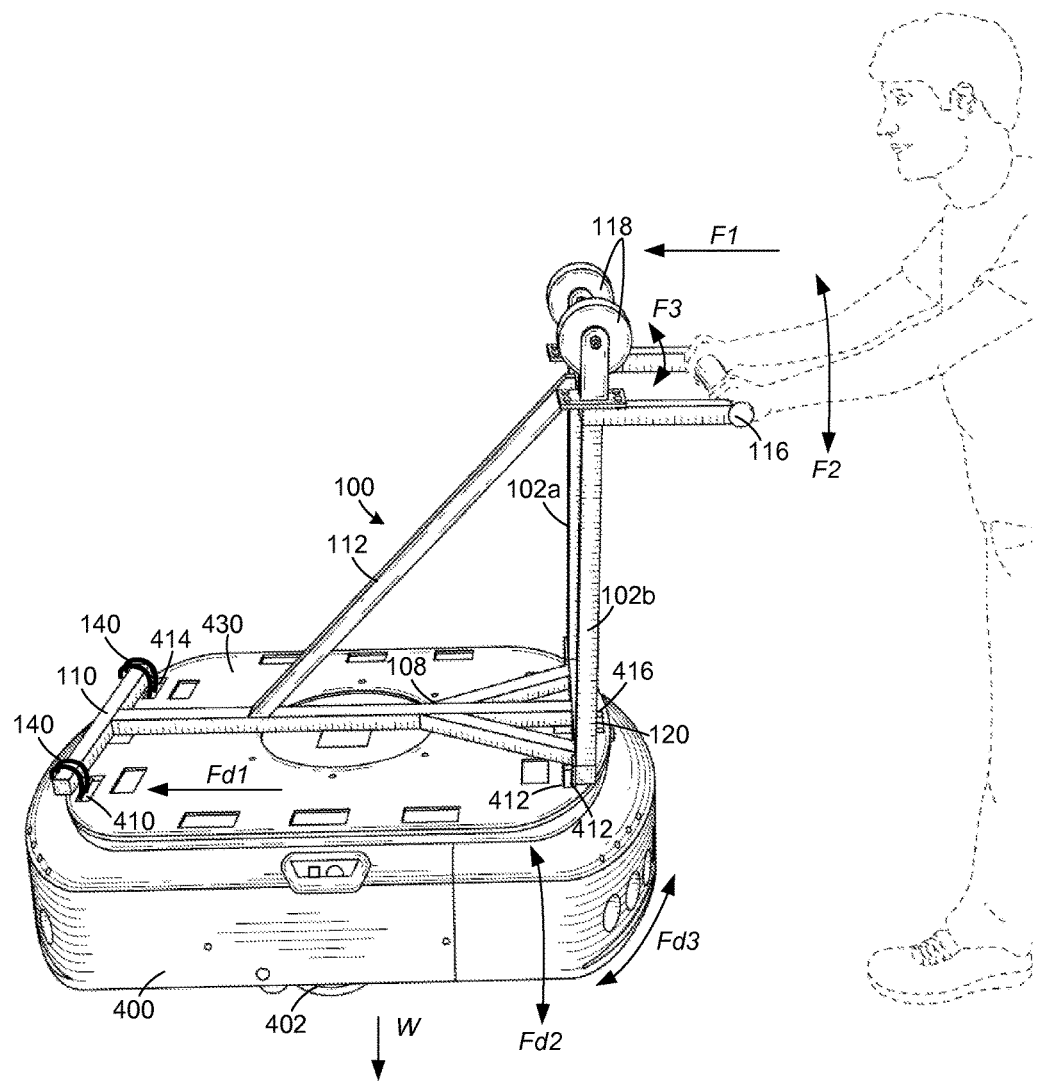
FIG. 4 provides a representative illustration of the transport handle mechanically coupled to a drive unit for displacement of the drive unit according to one example embodiment.
Figure 5:
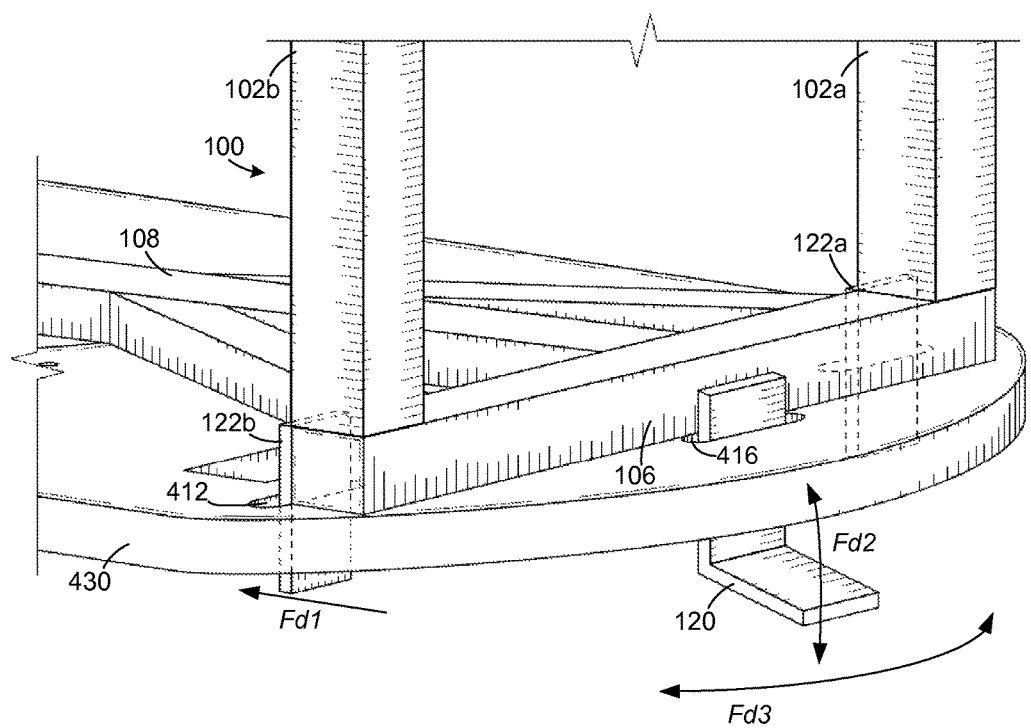
FIG. 5 provides a representative illustration of the transport handle mechanically coupled to a top surface of the drive unit according to one example embodiment.

In FIGS. 2 and 3, the transport handle 100 is illustrated in a position for transportation of a parcel or drive unit (not shown). Example embodiments of the transport handle 100 positioned upon a parcel or drive unit are illustrated in FIGS. 4 and 5. Generally, when used to transport a parcel or drive unit, the transport base extension bar 108, the transport base locking bar 106, and the transport base lateral support bar 110 comprise a bottom or base surface of the transport handle 100. The bottom or base surface of the transport handle 100 may mechanically couple to and rest upon the parcel or drive unit. In this context, it is noted that the transport base extension bar 108, the transport base locking bar 106, and the transport base lateral support bar 110 extend substantially within a same plane so that the transport handle 100 may rest at a nearly level position upon a top surface of an item being transported. Here, it is noted that the attachment member or hook 120 and/or the displacement members or facets 122a, 122b may extend beyond the plane of the base surface.

In the position for transportation, the extension arm 102, including sections 102a and 102b, extends upward from the base of the transport handle 100. The extension arm cross bar 104 is secured to one end of the extension arm 102, and the transport base locking bar 106 is secured to another end of the extension arm 102. As noted in FIG. 1, the transport base locking bar 106 includes an attachment member or hook 120 and displacement members or facets 122a, 122b. As further described below with reference to FIG. 5, the attachment member or hook 120 and displacement members or facets 122a, 122b may be relied upon to mechanically couple the transport handle 100 to an item for transportation. In one embodiment, the attachment member 120 is secured to a first face of the transport base locking bar 106, and the displacement members 122a, 122b are secured to a second face of the transport base locking bar 106.

When positioned upon a parcel or drive unit for transportation of the parcel or drive unit, the transport base extension bar 108 may extend over a top surface of the parcel or drive unit in a first direction. In various embodiments, the transport base extension bar 108 may extend over a substantial portion of the top surface of the parcel or drive unit. For example, the transport base extension bar 108 may be sized to extend over half, three quarters, or more of the length or width of the parcel or drive unit. Similarly, the transport base lateral support bar 110 may be sized to extend over half, three quarters, or more of the top surface of the parcel or drive unit, but in a second direction different than (e.g., perpendicular or at an angle to) the first direction. In one embodiment (see FIGS. 1 and 4), the transport base extension bar 108 extends in the first direction substantially orthogonal or perpendicular to the second direction in which the transport base lateral support bar 110 extends. It is also noted that, in one embodiment (see FIGS. 1 and 4), the transport base extension bar 108 extends substantially orthogonal or perpendicular to a direction in which the transport base locking bar 106 extends. In general, the respective lengths of the transport base extension bar 108, the transport base locking bar 106, and the transport base lateral support bar 110 may be selected such that the bottom or base surface of the transport handle 100 is of suitable size for securely resting upon the parcel or drive unit without tipping over.

In view of the discussion above, it should be appreciated that the length "L" of the transport base extension bar 108 may vary among embodiments, for example, depending upon the size of the item being transported using the transport handle 100. Also, while the cross-support bar 112 may be secured between the transport base extension bar 108 and the extension arm cross bar 104, it is noted that the cross-support bar 112 may be secured at various positions between the transport base extension bar 108 and the extension arm cross bar 104. Thus, the angle "A" between the transport base extension bar 108 and the cross-support bar 112 may vary among embodiments (as may the angle between the cross-support bar 112 and the extension arm cross bar 104).

As illustrated in FIG. 2, the handle 116 is secured to the extension arm cross bar 104. The handle 116 may be relied upon to apply the force "F" to the transport handle 100. In this manner, with the application of the force "F", the transport handle 100 may be pushed when rested upon a parcel or drive unit. In turn, the parcel or drive unit will also be subjected to the force "F", and the parcel or drive unit may be pushed from place to place along with the transport handle 100.

FIG. 4 provides a representative illustration of the transport handle 100 mechanically coupled to a drive unit 400 for displacement of the drive unit 400 according to one example embodiment. The drive unit 400 may comprise a KIVA® R drive unit configured to move shelving in a materials handling facility, although the KIVA® R drive unit is provided by way of example only, as the transport handle 100 may be relied upon for displacement of other movable items, parcels, robots, drive units, etc. The drive unit 400 includes one or more wheels 402 and a top surface 430 having apertures or through holes 410, 412, 414, and 416, among others. The relative positions of the apertures or through holes 410, 412, 414, and 416 may vary and, as discussed below, the positions of the attachment member or hook 120 and the displacement members or facets 122a, 122b may vary accordingly. FIG. 4 also illustrates attachment bands 140 that assist with securing the transport handle 100 to the drive unit 400.

Manually moving the drive unit 400 may be difficult due to its relatively low height, large weight, and low center of gravity. Further, if the drive unit 400 is in need of repair, the wheels 402 of the drive unit 400 may be stuck or offer resistance to movement. According to aspects of the embodiments described herein, the transport handle 100 may be relied upon to assist with manually moving the drive unit 400.

To secure the transport handle 100 to the drive unit 400, the transport handle 100 is positioned so as to insert the attachment hook 120 and the displacement facets 122a, 122b into corresponding apertures (e.g., 412, 416, etc.) in the top surface 430 of the drive unit 400. In certain embodiments, the attachment bands 140 may also be used to secure the transport handle 100 to the drive unit 400. As illustrated in FIG. 4, for example, the attachment bands 140 may be wrapped around the transport base lateral support bar 110 and through the apertures 410, 414, etc. in the top surface 430 of the drive unit 400. The attachment bands 140 may comprise string, rope, VELCRO®, elastic, wire, cable- or zip-ties, or other ties or bands suitable for the application, without limitation. It is noted that, in certain embodiments, the transport handle 100 may be used without the attachment bands 140.

Because the relative positions of the apertures 410, 412, 414, and 416 through the top surface 430 of the drive unit 400 may vary, the positions of the attachment hook 120 and the displacement facets 122a, 122b may also vary. In alternative embodiments, the attachment hook 120 and the displacement facets 122a, 122b may be secured to other elements of the base of the transport handle 100. For example, attachment and displacement members may be secured to the transport base lateral support bar 110 rather than or in addition to being secured to the transport base locking bar 106. Further, in various embodiments, the transport handle 100 may be secured to the drive unit 400 using elements other than the attachment hook 120 and the displacement facets 122a, 122b. For example, the attachment bands 140 may be relied upon without use of the attachment hook 120 and the displacement facets 122a, 122b. Alternatively or additionally, the base of the transport handle 100 may include snaps, pins, posts, or other interlocks or interlocking means for securing the transport handle 100 to the drive unit 400.

Once the transport handle 100 is secured to the drive unit 400, a force may be applied to the transport handle 100 to push the drive unit 400. As illustrated in FIG. 4, for example, the lateral force "F1" may be applied to the handle 116. In turn, the transport handle 100 displaces or translates a lateral force "Fd1" to the base of the transport handle 100. According to the arrangement and structure of the transport handle 100, a direction of the displaced lateral force "Fd1" is substantially the same as the direction of the lateral force "F1". Here, it is noted that the directions of both the forces "F1" and "Fd1" are substantially orthogonal to the force of the weight "W" of the drive unit 400 due to gravity. In this manner, the transport handle 100 displaces force in a direction suitable to overcome friction between the drive unit 400 and the ground, for example. The maintenance of the force "Fd1" in a direction orthogonal to the direction of the force of the weight "W" achieves good efficiency in work by avoiding translation of the force "F" to a direction parallel to the force "W" which may add to friction between the drive unit 400 and the ground.

In other aspects, the transport handle 100 may also displace or translate forces "F2" and "F3" at the handle 116 to forces "Fd2" and "Fd3", respectively, at the base of the transport handle 100. In other words, the transport handle 100 may displace an upward or downward force "F2" to an upward or downward force "Fd2" on the drive unit 400. Also, the transport handle 100 may displace a sideways force "F3" to a sideways force "Fd3" on the drive unit 400. It should also be appreciated that combinations of forces, in various directions, may be applied at the handle 116 of the transport handle 100. Such forces may be beneficial for pivoting the drive unit 400, for example.

As can be appreciated from FIG. 4, in exemplary embodiments, the transport handle 100 may be designed so that the handle 116 is at or near chest height. In this case, forces may be comfortably applied to the handle 116. Also, when the transport handle 100 is designed so that the handle 116 is at or near chest height, it may be easier and more comfortable for a user to apply the force "F" in a direction that is orthogonal to the direction of the force of the weight "W". Stated differently, if the user were to bend over and directly push against the drive unit 400, it is more likely that the applied force would include a component parallel (or additive) to the direction of the force of the weight "W", increasing friction and work.

In the context of the discussion above, it is noted that the size and shape of various elements of the transport handle 100 may vary among applications of various embodiments. For example, the length of the extension arms 102a and 102b may vary depending upon the size of the drive unit 400 and/or the height of the user. Similarly, the length of the transport base displacement extension bar 108 may vary depending upon the size of the drive unit 400. In certain embodiments, elements of the transport handle 100 may be adjustable so as to permit adjustment of the height of the handle 116.

FIG. 5 provides a representative illustration of the transport handle 100 mechanically coupled to the top surface 430 of the drive unit 400 according to one example embodiment. As illustrated in FIG. 5, the transport handle 100 is positioned so that the attachment hook 120 and the displacement facets 122a, 122b are inserted into corresponding apertures 412, 416, etc. through the top surface 430 of the drive unit 400. In this illustration, it is noted that the displacement facets 122a, 122b assist with the displacement or translation of the force "Fd1" to the top surface 430 of the drive unit 400. Similarly, the attachment hook 120 assists with the displacement or translation of the force "Fd1" to the top surface 430 of the drive unit 400. Depending upon the application, the attachment hook 120 and the displacement facets 122a, 122b also assist with the displacement or translation of the forces "Fd2" and/or "Fd3" to the top surface 430 of the drive unit 400.

Figure 6:
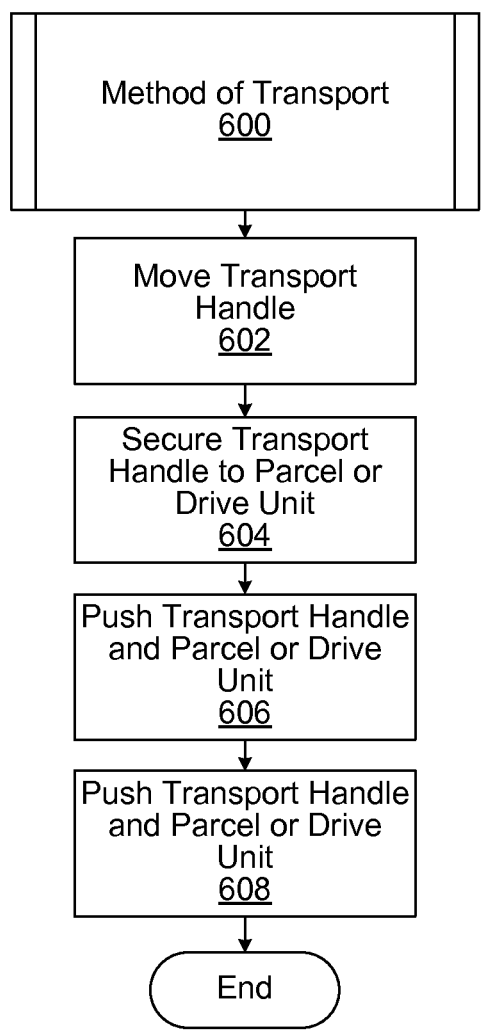
FIG. 6 illustrates a flow diagram of an example method of transport using a transport handle for moving a parcel or drive unit according to one example embodiment.

FIG. 6 illustrates a flow diagram of an example method of transport 600 using a transport handle for moving a parcel or drive unit according to one example embodiment. Before turning to the flowchart of FIG. 6, it is noted that, although FIG. 6 illustrates an order, it is understood that the order may differ from that which is depicted. For example, two or more blocks may be scrambled relative to the order shown. Further, in some embodiments, one or more blocks may be skipped or omitted. Also, although the method of transport 600 is described with reference to the transport handle 100 of FIGS. 1-5, the method of transport 600 may be used in connection with other transport handles that vary, at least in part, from the transport handle 100.

The method of transport 600 includes moving a transport handle to a location for movement of a parcel or drive unit at block 602, securing the transport handle upon the parcel or drive unit at block 604, pushing the transport handle and the parcel or drive unit to another location at block 606, and removing the transport handle from the parcel or drive unit at block 608. The transport handle used in the method of transport 600 may be substantially similar to the transport handle 100 of FIGS. 1-5, and the drive unit may be substantially similar to the drive unit 400 of FIGS. 4 and 5.

Moving the transport handle to a location for movement of a parcel or drive unit at block 602 may be performed substantially as described with reference to FIG. 1 in which the wheels 118 of the transport handle 100 are placed on the ground. In this position, the transport handle 100 may be pushed and rolled from place to place. Securing the transport handle upon the parcel or drive unit at block 604 may be performed by positioning (e.g., leaning, etc.) the transport handle 100 so as to insert the attachment hook 120 and the displacement facets 122a, 122b into the apertures 412, 416, etc. in the top surface 430 of the drive unit 400 (see FIG. 5). In certain embodiments, the attachment bands 140 may also be used to secure the transport handle 100 to the drive unit 400 at block 604.

Pushing the transport handle and the parcel or drive unit to another location at block 606 may be performed substantially as described with reference to FIG. 5, in which the force "F1" is applied to the transport handle 100. After the parcel or drive unit is pushed to a desired location, removing the transport handle from the parcel or drive unit at block 608 may be performed by positioning (e.g., leaning, etc.) the transport handle 100 so as to remove the attachment hook 120 and the displacement facets 122a, 122b from the apertures 412, 416, etc. in the top surface 430 of the drive unit 400 (see FIG. 5). The transport handle 100 may then be lifted off of the drive unit 400. According to the method of transport 600, items may be moved from place to place with relative ease.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A transport apparatus, comprising:
   an extension arm;
   an extension arm cross bar secured to one end of the extension arm; and
   a transport base locking bar secured to another end of the extension arm for mechanically coupling to an item for transport, the transport base locking bar including an attachment hook secured to a first face of the transport base locking bar and a displacement facet secured to a second face of the transport base locking bar, wherein the first face of the transport base locking bar and the second face of the transport base locking bar are separated by a third face of the transport base locking bar.

2. The transport apparatus according to claim 1, further comprising a handle secured to the extension arm cross bar.

3. The transport apparatus according to claim 1, further comprising:
   a transport base extension bar secured at one end to the transport base locking bar and extending substantially perpendicular to the transport base locking bar; and
   a cross-support bar secured between the extension arm cross bar and the transport base extension bar.

4. The transport apparatus according to claim 1, further comprising at least one wheel secured to the extension arm cross bar.

5. The transport apparatus according to claim 4, wherein the at least one wheel comprises at least two casters secured to the extension arm cross bar.

6. The transport apparatus according to claim 1, further comprising a transport base extension bar secured at one end to the transport base locking bar and extending substantially perpendicular from a substantial center of the transport base locking bar.

7. The transport apparatus according to claim 6, further comprising at least one transport base lateral support bar secured at another end of the transport base extension bar.

8. A transport apparatus, comprising:
   an extension arm;
   a handle and at least one wheel secured to one end of the extension arm;
   a transport base locking bar secured to another end of the extension arm for mechanically coupling to an item for transport, the transport base locking bar including an attachment hook secured to a first face of the transport base locking bar and a displacement facet secured to a second face of the transport base locking bar, wherein the first face of the transport base locking bar and the second face of the transport base locking bar are separated by a third face of the transport base locking bar; and
   a transport base extension bar secured at one end to the transport base locking bar for extending over a surface of the item for transport.

9. The transport apparatus according to claim 8, further comprising at least one transport base lateral support bar secured to another end of the transport base extension bar and extending substantially perpendicular to the transport base extension bar.

10. The transport apparatus according to claim 8, wherein the transport base locking bar and the transport base extension bar extend substantially within a plane, and the attachment hook and the displacement facet extend beyond the plane.

11. The transport apparatus according to claim 8, further comprising:
   an extension arm cross bar secured to the one end of the extension arm,
   wherein the at least one wheel comprises at least two casters secured to the extension arm cross bar.

12. A transport apparatus, comprising:
   an extension arm;
   an extension arm cross bar secured to one end of the extension arm;

a transport base locking bar secured to another end of the extension arm for mechanically coupling to an item for transport, the transport base locking bar including an attachment hook secured to a first face of the transport base locking bar and a displacement facet secured to a second face of the transport base locking bar, wherein the first face of the transport base locking bar and the second face of the transport base locking bar are separated by a third face of the transport base locking bar;

at least one transport base extension bar for extending over a surface of the item for transport in a first direction;

at least one transport base lateral support bar for extending over a surface of the item for transport in a second direction;

a handle secured to the extension arm cross bar; and at least one wheel secured to the extension arm cross bar for transporting the transport apparatus.

13. The transport apparatus according to claim 12, wherein each of the transport base locking bar, the at least one transport base extension bar, and the at least one transport base lateral support bar extend substantially within a same plane that forms a base surface for resting upon the item for transport.

14. The transport apparatus according to claim 13, wherein the attachment hook and the displacement facet extend beyond the plane that forms the base surface.

15. The transport apparatus according to claim 12, wherein:
   the extension arm comprises a first extension arm and a second extension arm each being secured to the extension arm cross bar; and
   the at least one wheel comprises at least two casters secured to the extension arm cross bar.

16. The transport apparatus according to claim 12, further comprising an attachment band to secure the at least one transport base lateral support bar to the item for transport.

17. The transport apparatus according to claim 12, wherein the first direction is substantially perpendicular to the second direction.

18. The transport apparatus according to claim 7, further comprising an attachment band to secure the at least one transport base lateral support bar to the item for transport.

19. The transport apparatus according to claim 9, further comprising an attachment band to secure the at least one transport base lateral support bar to the item for transport.

20. The transport apparatus according to claim 12, a cross-support bar secured between the extension arm cross bar and the transport base extension bar.

\* \* \* \* \*